United States Patent
Pan et al.

(10) Patent No.: US 12,507,004 B2
(45) Date of Patent: Dec. 23, 2025

(54) ABNORMAL SOUND DETECTION DEVICE AND ABNORMAL SOUND DETECTION METHOD

(71) Applicant: Primax Electronics Ltd., Taipei (TW)

(72) Inventors: Yung-Tai Pan, Taipei (TW); Ting-Yuan Cheng, Taipei (TW)

(73) Assignee: Primax Electronics Ltd., Taipei (TW)

( * ) Notice: Subject to any disclaimer, the term of this patent is extended or adjusted under 35 U.S.C. 154(b) by 237 days.

(21) Appl. No.: 18/381,587

(22) Filed: Oct. 18, 2023

(65) Prior Publication Data

US 2025/0063299 A1    Feb. 20, 2025

(30) Foreign Application Priority Data

Aug. 16, 2023   (TW) ................................ 112130756

(51) Int. Cl.
    *H04R 3/00*         (2006.01)
(52) U.S. Cl.
    CPC .................... *H04R 3/005* (2013.01)
(58) Field of Classification Search
    CPC ........ H04R 1/028; H04R 29/00; H04R 3/005; H04N 21/235; H04N 21/4345; H04N 21/435; H04N 21/8166; H04N 23/673; H04N 23/676; H04N 23/959; H04N 7/12; H02N 2/18; G06F 3/011; G01H 3/00
    USPC .............................................. 381/95, 56–58
    See application file for complete search history.

(56) References Cited

U.S. PATENT DOCUMENTS

| | | | | |
|---|---|---|---|---|
| 10,939,198 | B2* | 3/2021 | Tanaka | H04R 3/00 |
| 11,117,046 | B1* | 9/2021 | Denbigh | A63F 3/00643 |
| 2008/0045804 | A1* | 2/2008 | Williams | A61B 5/165 |
| | | | | 600/300 |
| 2008/0260189 | A1* | 10/2008 | Schobben | H04R 25/405 |
| | | | | 381/313 |
| 2009/0252355 | A1* | 10/2009 | Mao | H04R 1/1083 |
| | | | | 381/309 |
| 2012/0185418 | A1* | 7/2012 | Capman | G06F 3/165 |
| | | | | 706/12 |
| 2020/0067341 | A1* | 2/2020 | Glover | H02J 50/80 |

* cited by examiner

*Primary Examiner* — Lun-See Lao
(74) *Attorney, Agent, or Firm* — KIRTON McCONKIE; Evan R. Witt (57) ABSTRACT

An abnormal sound detection device for detecting a peripheral interface device includes a vibration simulation mechanism, an audio collecting device with plural audio collectors, and a controlling and analyzing device. The peripheral interface device generates a vibration sound wave in response to a vibration force from the vibration simulation mechanism. The plural audio collectors are used to collect the vibration sound wave and generate a vibration audio signal. The plural audio collectors are divided into at least two audio collection units. The controlling and analyzing device generates an abnormal sound detection signal. The vibration audio signal is inputted into the controlling and analyzing device. The controlling and analyzing device detects and identifies whether there is an abnormal sound phenomenon in the vibration audio signal. The abnormal sound detection signal contains at least two abnormal sound detection sub-signals in serial sequence.

13 Claims, 6 Drawing Sheets

ABNORMAL SOUND DETECTION DEVICE AND ABNORMAL SOUND DETECTION METHOD

FIELD OF THE INVENTION

The present invention relates to an abnormal sound detection device and an abnormal sound detection method applied to the abnormal sound detection device, and more particularly to an abnormal sound detection device for detecting whether a peripheral interface device has an abnormal sound phenomenon and an abnormal sound detection method applied to the abnormal sound detection device.

BACKGROUND OF THE INVENTION

Nowadays, various consumer electronic information products or consumer communication products on the market are becoming thinner and thinner. In addition, these products are usually equipped with various audio-visual functions to meet people's consumption and entertainment needs.

For example, the trends in designing notebook computers are toward small size and slimness. Consequently, various internal components in the notebook computer are getting closer to each other or contacted with each other. Generally, a notebook computer is equipped with a peripheral interface device (e.g., a key mechanical structure) for allowing the user to perform the key input operation. In addition, the notebook computer usually has a built-in sound device for outputting the sound. The sound device is an active component including plural speaker units. During the operation of the sound device, the plural speaker units are driven to convert various normal sound effect signals (such as music) into a vibration wave in a vibrating manner. Consequently, the sound that can be heard by the human ears is generated.

Furthermore, due to the limitation of the internal space, the installation position of the sound device is usually close to the key mechanical structure. Consequently, the vibration force generated by these speaker units (for example, the vibration force of the speaker units is caused by a certain segment of a music at a certain frequency) will result in a vibration effect on various mechanical structures (e.g., a scissors-type connecting structure under the key) of the key mechanical structure (i.e., a passive component) to produce a vibration sound wave. In case that the assembling or designing equality of an electronic product is in an abnormal condition, it is easy to produce unexplained high-frequency resonance audio signals. In addition, this abnormal sound phenomenon is easily sensed by the human ears.

Therefore, in the production process of the slim electronic product, it is important to timely detect the unexpected high-frequency resonance audio signal or abnormal sound and eliminate or improve the abnormal sound phenomenon in advance.

Conventionally, an abnormal sound detection device was used in the industry to detect the assembling quality status of the electronic product during the production process. The conventional abnormal sound detection device is equipped with a vibration simulation mechanism. A passive component to be tested is accommodated within the vibration simulation mechanism. For example, the passive component is a peripheral interface device (e.g., a key mechanical structure). Then, the vibration simulation mechanism generates a vibration force in response to abnormal sound detection signals at specified detection frequencies. In response to the vibration force, the peripheral interface device generates a vibration sound wave. Then, a small number of audio collectors (e.g., a single microphone or a single row of microphones) are used to collect the vibration sound wave, and a vibration audio signal is correspondingly generated. Afterwards, the abnormal sound detection device judges whether there is an abnormal sound phenomenon in the collected vibration audio signal.

However, the conventional technologies still has some drawbacks. As mentioned above, a small number of audio collectors in the conventional abnormal sound detection device are used to collect the vibration sound wave and generate the vibration audio signal. If the installation positions of the audio collectors are fixed, some problems occur. For example, since the distances between various regions of the under-test passive component (e.g., various keys in different regions of the key mechanical structure) and the fixed-type audio collectors are different, it is difficult to actually identify the regions of the under-test passive component where the abnormal sound is generated by judging the collected vibration audio signals. Furthermore, in case that the sound-receiving coverage range of the fixed-type audio collectors is unable to match the size of the passive component, a portion of the abnormal sound cannot be effectively detected.

In order to solve the above problems, another conventional abnormal sound detection device is equipped with movable-type audio collectors. The movable-type audio collectors collect the vibration audio signals in a movable manner. Consequently, the full-size range of the under-test passive component can be effectively detected. However, the uses of the movable-type audio collectors are not cost-effective. In addition, the mechanism for controlling and moving the audio collectors is very complicated.

For solving the problem associated with the controlling and moving mechanism and improving the sound-receiving efficacy, another conventional abnormal sound detection device is equipped with plural fixed-type audio collectors in an array arrangement. However, this abnormal sound detection device still has some drawbacks. Since the fixed-type audio collectors are arranged in the array to generate respective vibration audio signals, the overall number of the vibration audio signals is very huge. If the vibration audio signals are synchronously inputted and subjected to the abnormal sound analysis, the overall analysis workload will be very large. On the other hand, it is also a very difficult problem to eliminate or reduce the noise that is contained in a large amount of collected vibration audio signals.

Therefore, it is important to improve the abnormal sound detection device with plural audio collectors in an array arrangement. For example, the hardware component for efficiently controlling the audio collectors and the method of effectively collecting the vibration audio signals need to be specially designed. Furthermore, it is important to precisely and actually recognize and analyze the collected vibration audio signals in order to reduce the complexity and cost of the abnormal sound analysis.

SUMMARY OF THE INVENTION

The present invention provides an abnormal sound detection device and an abnormal sound detection method applied to the abnormal sound detection device. The abnormal sound detection device includes plural audio collectors in an array arrangement. The abnormal sound detection device is specially designed. Consequently, the hardware control efficiency is enhanced, and the vibration audio signal is subjected to the abnormal sound analysis more efficiently.

The present invention provides an abnormal sound detection device and an abnormal sound detection method for recognizing and analyzing the collected vibration audio signals more precisely and actually. Consequently, the complexity and cost of the abnormal sound analysis will be reduced.

In accordance with an aspect of the present invention, an abnormal sound detection device for detecting a peripheral interface device is provided. The abnormal sound detection device includes a vibration simulation mechanism, an audio collecting device and a controlling and analyzing device. The vibration simulation mechanism includes a mechanism body. The peripheral interface device is accommodated within the mechanism body. The vibration simulation mechanism generates a vibration force. The peripheral interface device generates a vibration sound wave in response to the vibration force. The audio collecting device includes plural audio collectors. The plural audio collectors are located near the mechanism body to collect the vibration sound wave. The audio collecting device generates a vibration audio signal in response to the vibration sound wave. The plural audio collectors are divided into at least two audio collection units. The at least two audio collection units are respectively distributed and located near at least two different regions of the peripheral interface device. The controlling and analyzing device electrically connected with the vibration simulation mechanism and the audio collecting device. The controlling and analyzing device generates an abnormal sound detection signal to control the vibration simulation mechanism to generate the vibration force. The vibration audio signal from the audio collecting device is inputted into the controlling and analyzing device. The controlling and analyzing device detects and identifies whether there is an abnormal sound phenomenon in the vibration audio signal. The abnormal sound detection signal contains at least two abnormal sound detection sub-signals in serial sequence. The at least two audio collection units of the audio collecting device are selectively enabled in turn at different time points in response to the at least two abnormal sound detection sub-signals. The vibration simulation mechanism is controlled to generate the vibration force in response to the at least two abnormal sound detection sub-signals. The peripheral interface device generates the vibration sound wave in response to the vibration force. When the at least two audio collection units are enabled at the different time points, the enabled audio collection units generate corresponding vibration audio unit signals to the controlling and analyzing device. Consequently, corresponding abnormal sound analysis processes are performed. The vibration audio unit signals are arranged in serial sequence and formed as the vibration audio signal.

In an embodiment, the peripheral interface device at least includes a key mechanical structure.

In an embodiment, the vibration simulation mechanism includes the mechanism body and a vibration generator. The vibration generator is located near the mechanism body and electrically connected with the controlling and analyzing device. The vibration generator generates the vibration force in response to the abnormal sound detection signal. The vibration force is transmitted from the vibration generator to the peripheral interface device within the mechanism body.

In an embodiment, the mechanism body at least includes an upper cover and a base plate, and the peripheral interface device is arranged between the upper cover and the base plate. The vibration generator is located near or attached on the base plate.

In an embodiment, one of the vibration simulation mechanism and the controlling and analyzing device further includes a driving and amplifying unit. After the abnormal sound detection signal is amplified by the driving and amplifying unit, an amplified abnormal sound detection signal is generated, and the vibration generator generates the vibration force in response to the amplified abnormal sound detection signal.

In an embodiment, each of the abnormal sound detection sub-signals is a frequency-sweeping test signal or a pink noise test signal.

In an embodiment, each of the plural audio collectors is a microphone, a sound guide tube or a patch-type sound receiving element.

In an embodiment, the plural audio collectors are distributed in an array arrangement, and each row of audio collectors or each column of audio collectors in the array arrangement are classified into the at least two audio collection units.

In an embodiment, the audio collecting device further includes an audio collection unit selector. The at least two audio collection units are selectively enabled in turn by the audio collection unit selector at the different time points.

In an embodiment, the audio collecting device is a fixed-type audio collecting device or a movable-type audio collecting device.

In an embodiment, the controlling and analyzing device includes a storage module, a controlling and processing module and an analyzing and detecting module. The storage module is electrically connected with the audio collecting device. The plural vibration audio unit signals are inputted and stored into the storage module. The controlling and processing module is electrically connected with the storage module, the vibration simulation mechanism and the audio collecting device. The controlling and processing module controls and generates the abnormal sound detection signal. The abnormal sound detection signal is issued to the audio collecting device and the vibration simulation mechanism. The plural the vibration audio unit signals are inputted into the controlling and processing module. The analyzing and detecting module is electrically connected with the controlling and processing module. The analyzing and detecting module detects and identifies whether there is the abnormal sound phenomenon in any of the plural vibration audio unit signals.

In an embodiment, each of the plural abnormal sound detection sub-signals contains a frequency-sweeping test signal or a pink noise test signal and further contains a synchronization signal posterior to the frequency-sweeping test signal or the pink noise test signal. The analyzing and detecting module recognizes and analyzes the frequency-sweeping test signal or the pink noise test signal adjacent to the synchronization signal. After the frequency-sweeping test signal or the pink noise test signal is inputted into the vibration simulation mechanism, the audio collecting device generates the corresponding vibration audio unit signal with an effective identification vibration audio section, and the analyzing and detecting module judges whether there is the abnormal sound phenomenon in the effective identification vibration audio section.

In an embodiment, each of the plural abnormal sound detection sub-signals contains an audio collection unit selecting signal and one of a frequency-sweeping test signal and a pink noise test signal sequentially, or the each of the plural abnormal sound detection sub-signals contains the audio collection unit selecting signal, one of the frequency-sweeping test signal and the pink noise test signal and a synchronization signal sequentially.

In accordance with another aspect of the present invention, an abnormal sound detection method for detecting a peripheral interface device is provided. The abnormal sound detection method including the following steps. In a step (a), a vibration simulation mechanism is provided, and the peripheral interface device is accommodated within the vibration simulation mechanism. In a step (b), an audio collecting device with plural audio collectors is placed near the vibration simulation mechanism. The plural audio collectors are divided into at least two audio collection units. The at least two audio collection units are respectively distributed and located near at least two different regions of the peripheral interface device. In a step (c), the audio collecting device selectively enables the at least two audio collection units in turn at different time points in response to an abnormal sound detection signal. The abnormal sound detection signal contains at least two abnormal sound detection sub-signals in serial sequence. In a step (d), a vibration force is generated by the vibration simulation mechanism in response to the abnormal sound detection signal. The peripheral interface device generates a vibration sound wave in response to the vibration force. In a step (e), the enabled audio collection units of the at least two audio collection units collect the vibration sound wave and generate corresponding vibration audio unit signals at the different time points. The vibration audio unit signals are arranged in serial sequence and formed as the vibration audio signal. In a step (f), corresponding abnormal sound analysis processes are performed in response to the vibration audio unit signals.

In an embodiment, the peripheral interface device at least includes a key mechanical structure.

In an embodiment, each of the plural audio collectors is a microphone, a sound guide tube or a patch-type sound receiving element.

In an embodiment, the plural audio collectors are distributed in an array arrangement, and each row of audio collectors or each column of audio collectors in the array arrangement are classified into the at least two audio collection units.

In an embodiment, the plural abnormal sound detection sub-signals contain plural audio collection unit selecting signals, respectively. The at least two audio collection units of the audio collecting device are selectively enabled in turn at the different time points in response to the corresponding audio collection unit selecting signals.

In an embodiment, each of the plural abnormal sound detection sub-signals contains a frequency-sweeping test signal or a pink noise test signal. The vibration simulation mechanism generates the vibration force in response to the frequency-sweeping test signal or the pink noise test signal. The peripheral interface device generates the vibration sound wave in response to the vibration force.

In an embodiment, each of the plural abnormal sound detection sub-signals contains a frequency-sweeping test signal or a pink noise test signal and further contains a synchronization signal posterior to the frequency-sweeping test signal or the pink noise test signal. After the frequency-sweeping test signal or the pink noise test signal adjacent to the synchronization signal is recognized and analyzed in response to the synchronization signal, the frequency-sweeping test signal or the pink noise test signal is inputted into the vibration simulation mechanism, and the audio collecting device generates the corresponding vibration audio unit signal with an effective identification vibration audio section. The abnormal sound detection method further includes a step of judging whether there is the abnormal sound phenomenon in the effective identification vibration audio section.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. In the following embodiments and drawings, the elements irrelevant to the concepts of the present invention are omitted and not shown.

Figure 1:
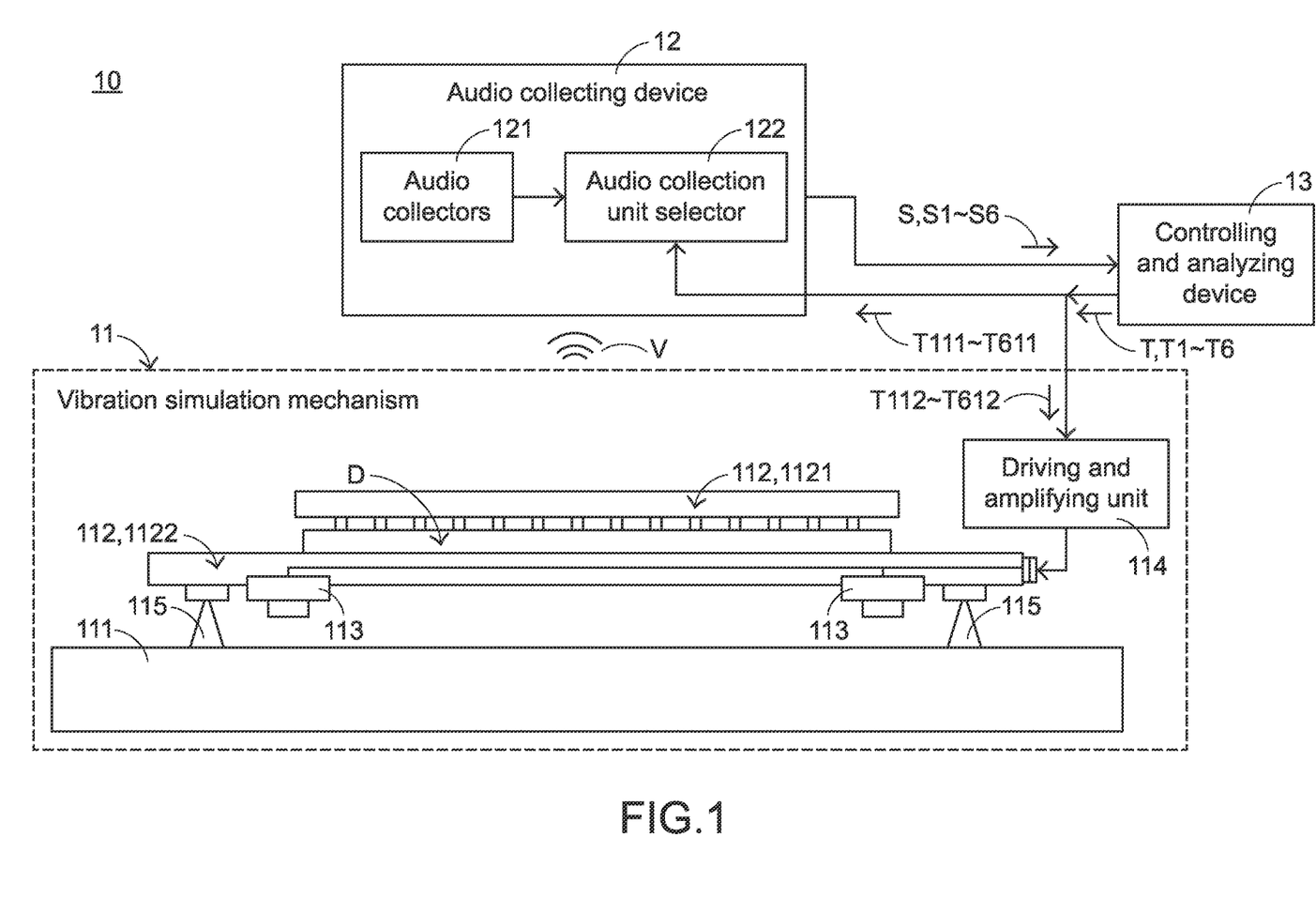
FIG. 1 schematically illustrates the architecture of an abnormal sound detection device according to an embodiment of the present invention.
Figure 2A:
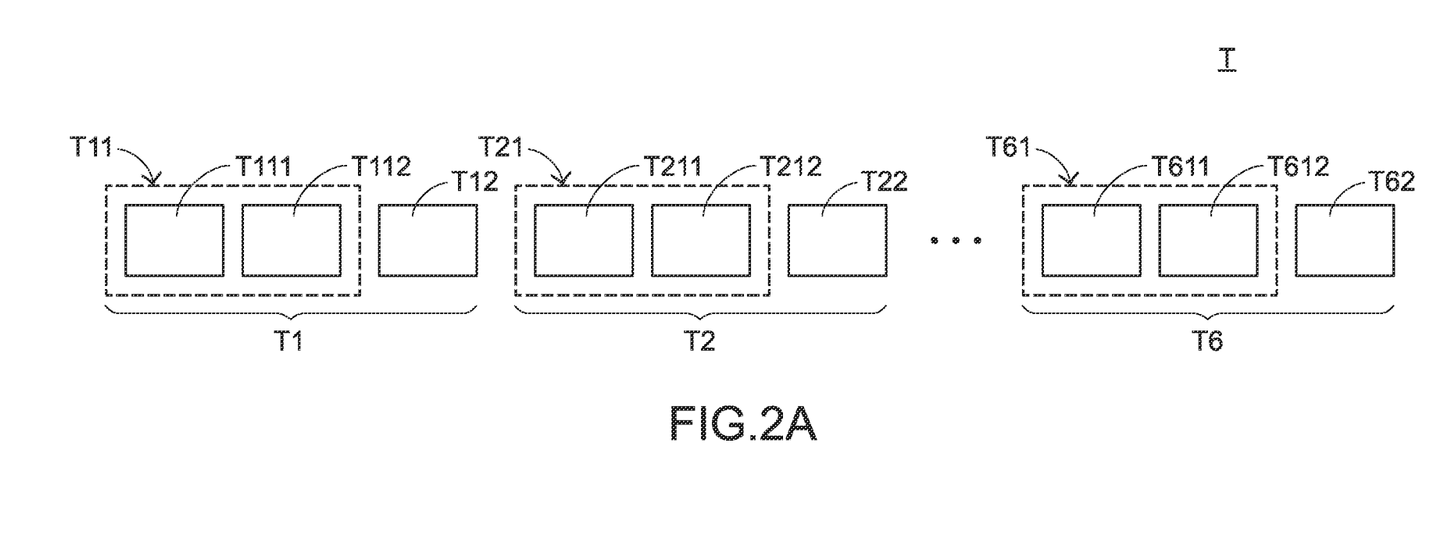
FIG. 2A schematically illustrates the constituents of an abnormal sound detection signal generated by the abnormal sound detection device as shown in FIG. 1.

FIG. 1 schematically illustrates the architecture of an abnormal sound detection device according to an embodiment of the present invention. FIG. 2A schematically illustrates the constituents of an abnormal sound detection signal generated by the abnormal sound detection device as shown in FIG. 1.

As shown in FIG. 1, the abnormal sound detection device 10 is used for detecting a peripheral interface device D (e.g., a key mechanical structure). The abnormal sound detection device 10 at least comprises a vibration simulation mechanism 11, an audio collecting device 12 and a controlling and analyzing device 13. The audio collecting device 12 at least comprises plural audio collectors 121 and an audio collection unit selector 122.

In an embodiment, the vibration simulation mechanism 11 comprises a detection platform 111, a mechanism body 112, a vibration generator 113 and a driving and amplifying unit 114. The peripheral interface device D is accommodated within the mechanism body 112. The vibration generator 113 is located near the mechanism body 112.

The mechanism body 112 is installed on the detection platform 111 through plural anti-vibration elements 115. That is, the plural anti-vibration elements 115 are arranged between the detection platform 111 and the mechanism body 112. The anti-vibration elements 115 can be used as buffering structures between the detection platform 111 and the mechanism body 112.

The mechanism body 112 at least comprises an upper cover 1121 and a base plate 1122. The peripheral interface device D is arranged between the upper cover 1121 and the base plate 1122. Preferably but not exclusively, the vibration generator 113 is located near or attached on the base plate 1122.

The controlling and analyzing device 13 is used for generating an abnormal sound detection signal T. In response to the abnormal sound detection signal T, the vibration simulation mechanism 11 is controlled to generate a vibration force. In response to the vibration force, the peripheral interface device D generates a vibration sound wave V. The driving and amplifying unit 114 receives the abnormal sound detection signal T. As shown in FIG. 2A, the abnormal sound detection signal T contains plural abnormal sound detection sub-signals T1~T6. The plural abnormal sound detection sub-signals T1~T6 comprises plural test signals T112~T612, respectively. After these signals are amplified by the driving and amplifying unit 114, the amplified signals are transmitted to the vibration generator 113 and thus the vibration force is generated. In response to the vibration force, the peripheral interface device D generates the vibration sound wave V.

It is noted that numerous modifications and alterations may be made while retaining the teachings of the invention. For example, in another embodiment, the driving and amplifying unit 114 is installed in the controlling and analyzing device 13.

In accordance with a feature of the present invention, the audio collecting device 12 with the plural audio collectors 121 and the audio collection unit selector 122 are located near the mechanism body 112. The plural audio collectors 121 are divided into at least two audio collection units. The at least two audio collection units are respectively distributed and located near at least two regions of the peripheral interface device D to collect the vibration sound wave V. In response to the vibration sound wave V, the audio collecting device 12 generates a vibration audio signal S. The vibration audio signal S is inputted into the controlling and analyzing device 13. Consequently, the controlling and analyzing device 13 detects and identifies whether there is an abnormal sound phenomenon in the vibration audio signal S.

Figure 2B:
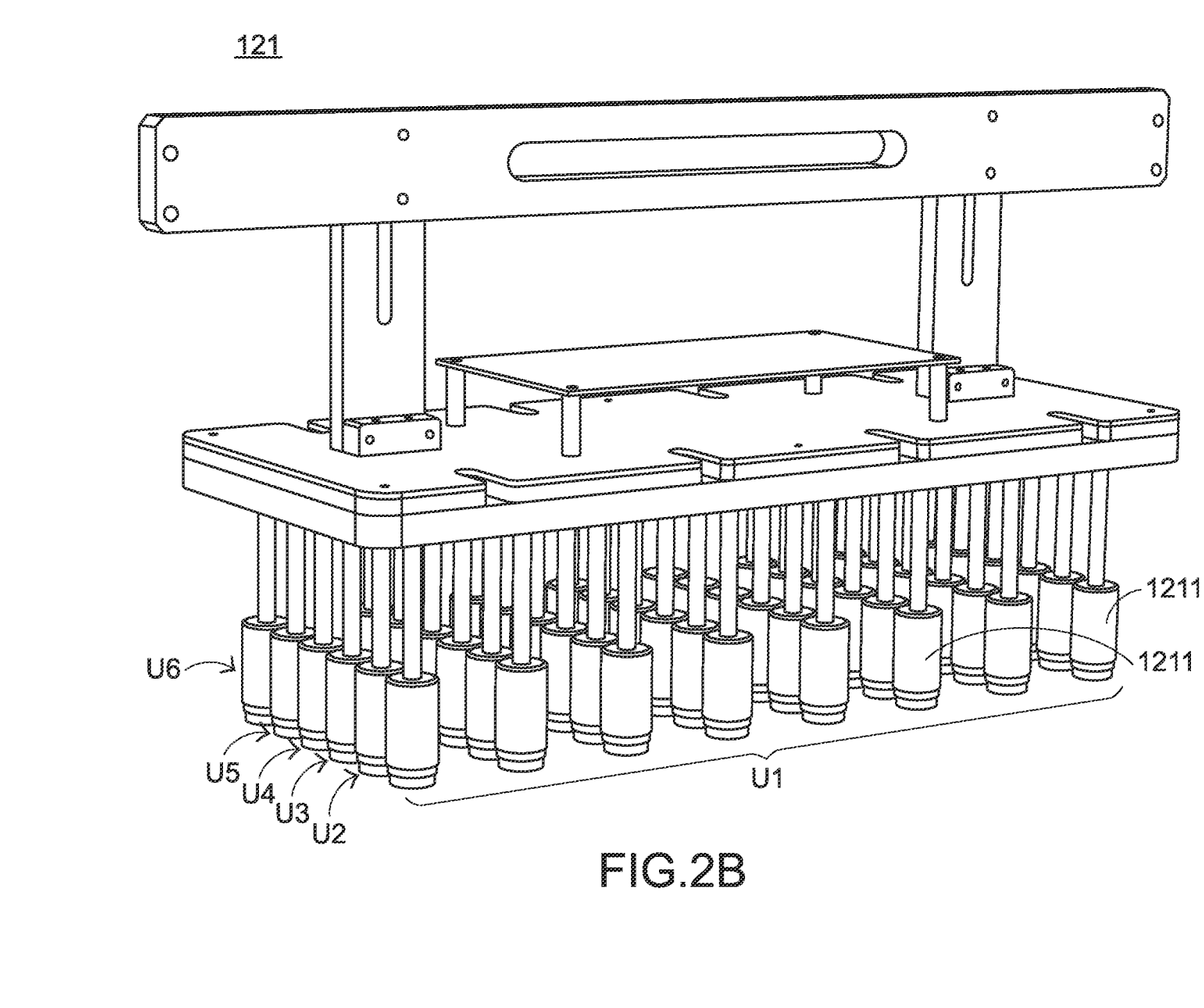
FIG. 2B is a schematic perspective view illustrating the audio collectors in the audio collecting device of the abnormal sound detection device as shown in FIG. 1.

FIG. 2B is a schematic perspective view illustrating the audio collectors in the audio collecting device of the abnormal sound detection device as shown in FIG. 1. As shown in FIG. 2B, each audio collector 1211 of the plural audio collectors 121. The audio collector 1211 is a microphone, a sound guide tube or a patch-type sound receiving element.

In this embodiment, the plural audio collectors 121 are distributed in an array arrangement. In the array of the plural audio collectors 121, each row of audio collectors 121 (e.g., eight audio collectors 1211 in each row) or each column of audio collectors 121 (e.g., six audio collectors 1211 in each column) may be classified into an audio collection unit. In the embodiment of FIG. 2B, the plural audio collectors 121 are classified into six audio collection units U1~U6.

Please refer to FIG. 2A again. In the abnormal sound detection signal T, the plural abnormal sound detection sub-signals T1~T6 also comprise plural audio collection unit selecting signals T111~T611, respectively. Due to the uses of the audio collection unit selecting signals T111~T611, the controlling and analyzing device 13 will not receive too many input signals at one time. In response to the audio collection unit selecting signals T111~T611, the controlling and analyzing device 13 controls the audio collection unit selector 122 to preferentially and selectively enable the audio collection units U1~U6 in turn at different time points.

While one of the audio collection units U1~U6 is enabled, the vibration generator 113 generates the corresponding vibration force in response to the corresponding test signal of the test signals T112~T612. In response to the vibration force, the peripheral interface device D generates the corresponding vibration sound wave V. Meanwhile, the enabled audio collection unit of the audio collection units U1~U6 generates the corresponding vibration audio unit signals S1~S6. Consequently, the vibration audio unit signals S1~S6 are sequentially generated at different time points. The vibration audio unit signals S1~S6 are generated in serial sequence and formed as the vibration audio signal S.

The constituents of the abnormal sound detection signal T will be described with reference to FIG. 2A. As mentioned above, the audio collecting device 12 comprises the six audio collection units U1~U6. The abnormal sound detection signal T is constituted by the six abnormal sound detection sub-signals T1~T6. In response to the six abnormal sound detection sub-signals T1~T6, the corresponding abnormal sound detection processes are performed by the six audio collection units U1~U6 at different time points. The six abnormal sound detection sub-signals T1~T6 respectively contain the six audio collection unit selecting signals T111~T611 and the six test signals T112~T612. The six test signals T112~T612 are posterior to the six audio collection unit selecting signal T111~T611, respectively. In an embodiment, the audio collection unit selecting signal T111 and the test signal T112 are collaboratively formed as a selecting and test signal T11. Similarly, the audio collection unit selecting signal T211 and the test signal T212 are collaboratively formed as a selecting and test signal T21. Similarly, the audio collection unit selecting signal T311 and the test signal T312 are collaboratively formed as a selecting and test signal T31. Similarly, the audio collection unit selecting signal T411 and the test signal T412 are collaboratively formed as a selecting and test signal T41. Similarly, the audio collection unit selecting signal T511 and the test signal T512 are collaboratively formed as a selecting and test signal T51. Similarly, the audio collection unit selecting signal T611 and the test signal T612 are collaboratively formed as a selecting and test signal T61.

Each of the test signals T112~T612 is one of a frequency-sweeping test signal and a pink noise test signal. The frequency-sweeping test signal is a test signal whose test frequency range gradually rises to 20 kHz from zero or gradually decreases to zero from 20 kHz within a certain time interval. The pink noise test signal is a 0~20 kHz mixed-frequency test signal whose power spectral density (PSD) is higher in the low frequency range and gradually decreases from the low frequency to the high frequency. It is noted that the test signal used in this context is not restricted to the frequency-sweeping test signal or the pink noise test signal.

As mentioned above, the signal arrangement of the abnormal sound detection signal T is specially designed. The plural audio collectors 121 of the audio collecting device 12 are distributed in the array arrangement. The audio collection units U1~U6 are selectively enabled in turn, and thus the hardware control efficiency is enhanced. In addition, the vibration audio signal S is sequentially collected and subjected to the abnormal sound analysis in an efficient manner.

An implementation example of the abnormal sound detection device will be described in more details as follows.

Figure 3:
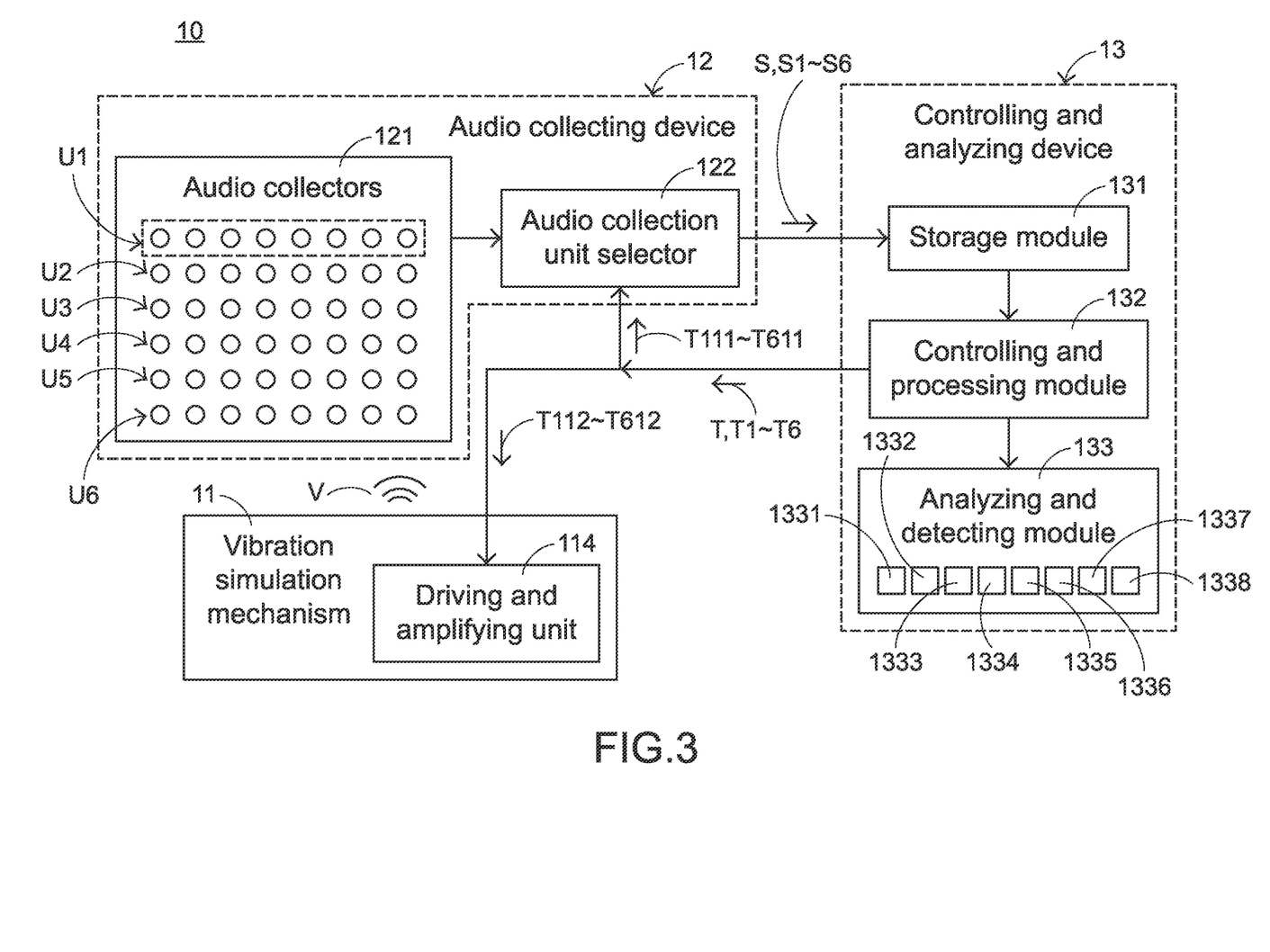
FIG. 3 is schematic functional block diagram illustrating the operations of the audio collecting device and the controlling and analyzing device in the abnormal sound detection device as shown in FIG. 1.

Please refer to FIGS. 1, 2A, 2B and 3. FIG. 3 is schematic functional block diagram illustrating the operations of the audio collecting device and the controlling and analyzing device in the abnormal sound detection device as shown in FIG. 1. As shown in FIG. 3, the plural audio collectors 121 are classified into the six audio collection units U-U6, and the six audio collection units U-U6 cooperatively work with the audio collection unit selector 122.

In an embodiment, the controlling and analyzing device 13 comprises a storage module 131, a controlling and processing module 132 and an analyzing and detecting module 133. The storage module 131 is electrically connected with the audio collecting device 12. The vibration audio unit signals S1~S6 are inputted and stored into the storage module 131. The controlling and processing module 132 is electrically connected with the storage module 131, the vibration simulation mechanism 11 and the audio collecting device 12. The controlling and processing module 132 is used for controlling and generating the abnormal sound detection sub-signals T1~T6. The abnormal sound detection sub-signals T1~T6 are issued to the audio collecting device 12 and the vibration simulation mechanism 11. In addition, the controlling and processing module 132 receives the vibration audio unit signals S1~S6. The analyzing and detecting module 133 is electrically connected with the controlling and processing module 132. The analyzing and detecting module 133 is used for detecting and identifying whether any of the vibration audio unit signals S1~S6 has an abnormal sound phenomenon.

Preferably but not exclusively, each of the controlling and processing module 132 and the analyzing and detecting module 133 is implemented with a full hardware configuration, a firmware component or a software (e.g., APP).

As shown in FIG. 2B and FIG. 3, each row of audio collectors comprise eight audio collectors 1211 for generating one of the vibration audio unit signals S1~S6. In order to further increase the processing efficiency, the analyzing and detecting module 133 comprises eight analyzing and detecting sub-modules 1331~1338 for performing the synchronization abnormal sound analysis on each of the vibration audio unit signals S1~S6. That is, the analyzing and detecting sub-modules 1331~1338 respectively detect and identify whether the output signals from the eight audio collectors 1211 in each row has the abnormal sound phenomenon.

The constituents of the abnormal sound detection signal may be varied according to the practical requirements. As shown in FIG. 2A, the abnormal sound detection sub-signals T1~T6 further comprise corresponding synchronization signals T12~T62, respectively. The synchronization signals T12~T62 are posterior to the six test signals T112~T612, respectively. In response to a specified synchronization signal of the synchronization signals T12~T62, the analyzing and detecting module 133 recognizes and analyzes the test signal adjacent to the specified synchronization signal of the synchronization signals T12~T62. After the test signal is inputted into the vibration simulation mechanism 11, the audio collecting device 12 generates the corresponding vibration audio unit signal with an effective identification vibration audio section. In addition, the analyzing and detecting module 133 judges whether there is an abnormal sound phenomenon in the effective identification vibration audio section.

For example, in response to the synchronization signal T22, the analyzing and detecting module 133 only needs to recognize and analyze the test signal T212, which is adjacent and prior to the synchronization signal T22. The test signals T212 is one of a frequency-sweeping test signal and a pink noise test signal. After the test signal T212 is inputted into the vibration simulation mechanism 11, the audio collecting device 12 generates the corresponding vibration audio unit signal S2 with the effective identification vibration audio section. In addition, the analyzing and detecting module 133 judges whether there is an abnormal sound phenomenon in the effective identification vibration audio section. Consequently, when the second audio collection unit U2 is enabled and subjected to the abnormal sound analysis, the noise also collected by the enabled the second audio collection unit U2 and contained in the vibration audio unit signal S2 can be effectively eliminated.

In other words, the abnormal sound detection sub-signal T1 contains the audio collection unit selecting signal T111, the test signal T112 and the synchronization signal T12 sequentially. Similarly, the abnormal sound detection sub-signal T2 contains the audio collection unit selecting signal T211, the test signal T212 and the synchronization signal T22 sequentially. Similarly, the abnormal sound detection sub-signal T3 contains the audio collection unit selecting signal T311, the test signal T312 and the synchronization signal T32 sequentially. Similarly, the abnormal sound detection sub-signal T4 contains the audio collection unit selecting signal T411, the test signal T412 and the synchronization signal T42 sequentially. Similarly, the abnormal sound detection sub-signal T5 contains the audio collection unit selecting signal T511, the test signal T512 and the synchronization signal T52 sequentially. Similarly, the abnormal sound detection sub-signal T6 contains the audio collection unit selecting signal T611, the test signal T612 and the synchronization signal T62 sequentially.

In an embodiment, the audio collecting device 12 is a fixed-type audio collecting device. However, in order to increase the resolution of the identification and analysis, the fixed-type audio collecting device is replaced by a movable-type audio collecting device.

Figure 4A:
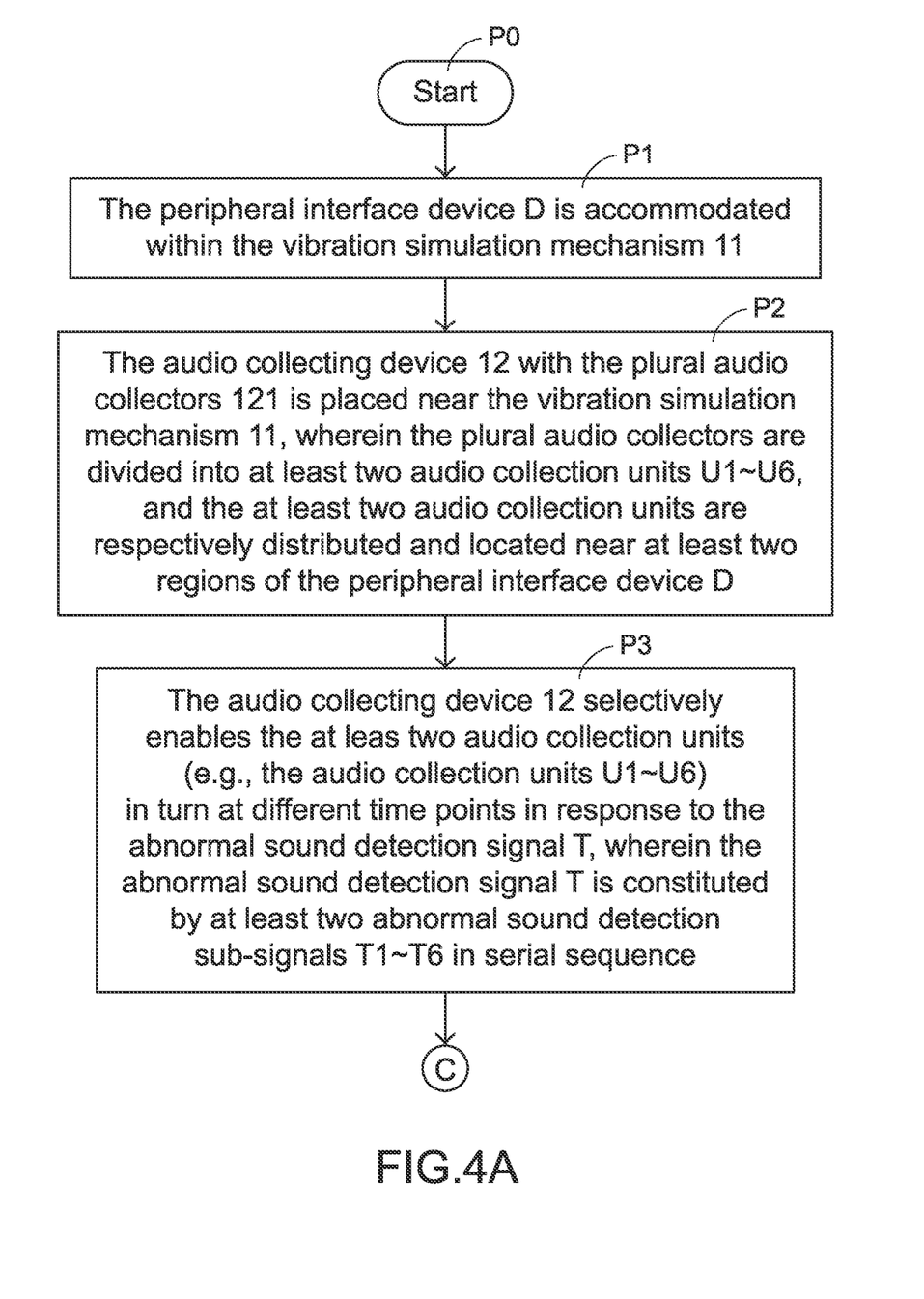
FIGS. 4A and 4B schematically illustrate the flowchart of an abnormal sound detection method according to an embodiment of the present invention.
Figure 4B:
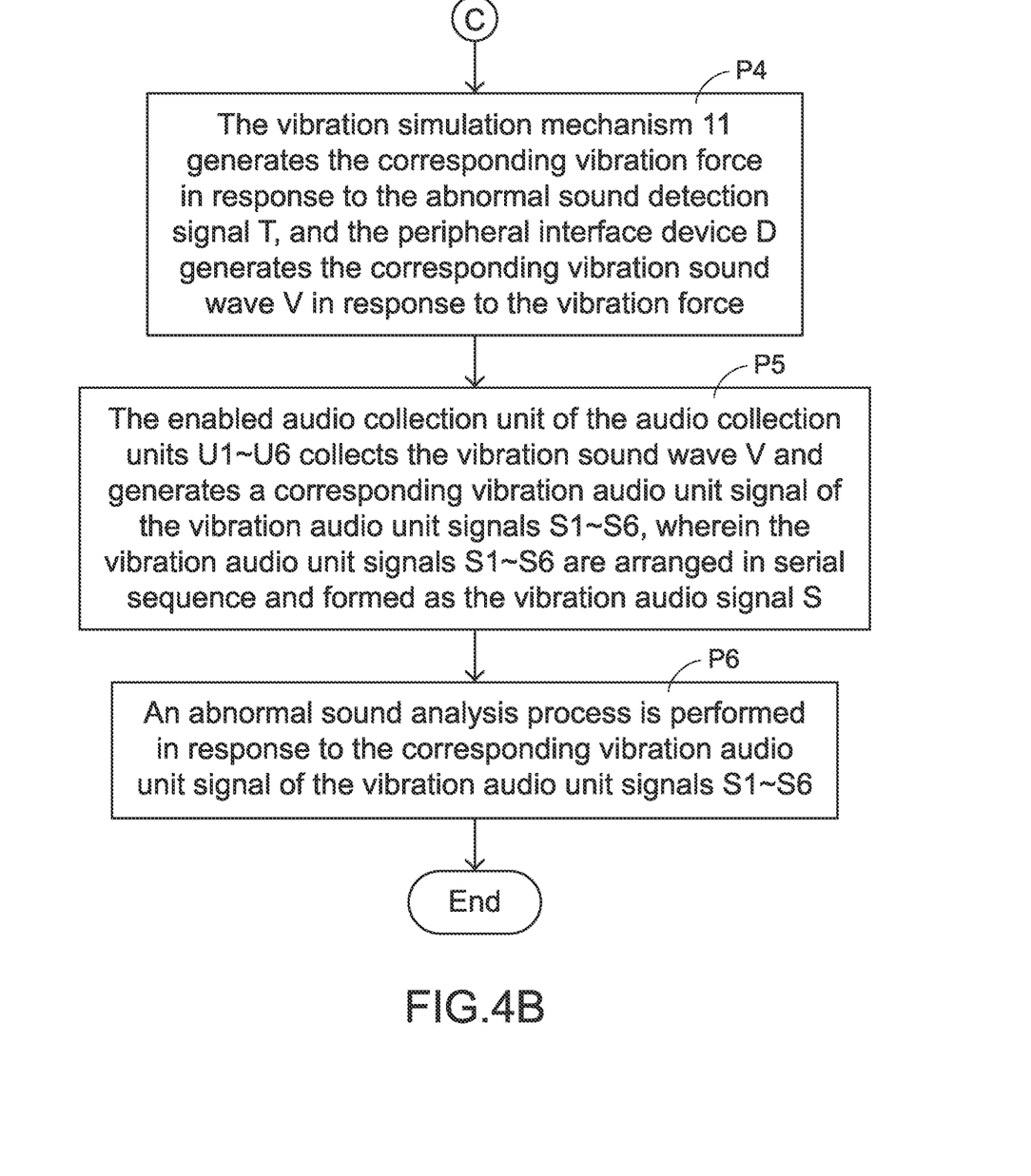

The present invention also provides an abnormal sound detection method. The abnormal sound detection method is applied to the peripheral interface device D. Please refer to FIGS. 1 to 3 and FIGS. 4A and 4B. FIGS. 4A and 4B schematically illustrate the flowchart of an abnormal sound detection method according to an embodiment of the present invention.

In a step P0, the flowchart is started.

In a step P1, the vibration simulation mechanism 11 is provided, and the peripheral interface device D is accommodated within the vibration simulation mechanism 11.

In a step P2, the audio collecting device 12 with the plural audio collectors 121 is placed near the vibration simulation mechanism 11, wherein the plural audio collectors are divided into at least two audio collection units (e.g., six audio collection units U1~U6), and the at least two audio collection units are respectively distributed and located near at least two regions of the peripheral interface device D.

In a step P3, the audio collecting device 12 selectively enables the at least two audio collection units (e.g., the audio collection units U1~U6) in turn at different time points in response to the abnormal sound detection signal T, wherein the abnormal sound detection signal T is constituted by at least two abnormal sound detection sub-signals T1~T6 in serial sequence.

In a step P4, the vibration simulation mechanism 11 generates the corresponding vibration force in response to the abnormal sound detection signal T, and the peripheral interface device D generates the corresponding vibration sound wave V in response to the vibration force.

In a step P5, the enabled audio collection unit of the audio collection units U-U6 collects the vibration sound wave V and generates a corresponding vibration audio unit signal of the vibration audio unit signals S1~S6, wherein the vibration audio unit signals S1~S6 are arranged in serial sequence and formed as the vibration audio signal S.

In a step P6, an abnormal sound analysis process is performed in response to the corresponding vibration audio unit signal of the vibration audio unit signals S1~S6.

From the above descriptions, the present invention provides an abnormal sound detection device and an abnormal sound detection method applied to the abnormal sound detection device. The abnormal sound detection device and the abnormal sound detection method are effectively used to simulate and detect whether the peripheral interface device has an abnormal sound phenomenon in response to various vibration forces. In other words, the abnormal sound detection device and the abnormal sound detection method of the present invention are industrially valuable.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. An abnormal sound detection device for detecting a peripheral interface device, the abnormal sound detection device comprising:
    a vibration simulation mechanism comprising a mechanism body, wherein the peripheral interface device is accommodated within the mechanism body, the vibration simulation mechanism generates a vibration force, and the peripheral interface device generates a vibration sound wave in response to the vibration force;
    an audio collecting device with plural audio collectors, wherein the plural audio collectors are located near the mechanism body to collect the vibration sound wave, and the audio collecting device generates a vibration audio signal in response to the vibration sound wave, wherein the plural audio collectors are divided into at least two audio collection units, and the at least two audio collection units are respectively distributed and located near at least two different regions of the peripheral interface device; and
    a controlling and analyzing device electrically connected with the vibration simulation mechanism and the audio collecting device, wherein the controlling and analyzing device generates an abnormal sound detection signal to control the vibration simulation mechanism to generate the vibration force, the vibration audio signal from the audio collecting device is inputted into the controlling and analyzing device, and the controlling and analyzing device detects and identifies whether there is an abnormal sound phenomenon in the vibration audio signal,
    wherein the abnormal sound detection signal contains at least two abnormal sound detection sub-signals in serial sequence, and the at least two audio collection units of the audio collecting device are selectively enabled in turn at different time points in response to the at least two abnormal sound detection sub-signals, and the vibration simulation mechanism is controlled to generate the vibration force in response to the at least two abnormal sound detection sub-signals, and the peripheral interface device generates the vibration sound wave in response to the vibration force,
    wherein when the at least two audio collection units are enabled at the different time points, the enabled audio collection units generate corresponding vibration audio unit signals to the controlling and analyzing device, so that corresponding abnormal sound analysis processes are performed, wherein the vibration audio unit signals are arranged in serial sequence and formed as the vibration audio signal.

2. The abnormal sound detection device according to claim 1, wherein the peripheral interface device at least includes a key mechanical structure.

3. The abnormal sound detection device according to claim 1, wherein the vibration simulation mechanism comprises:
    the mechanism body; and
    a vibration generator located near the mechanism body and electrically connected with the controlling and analyzing device, wherein the vibration generator generates the vibration force in response to the abnormal sound detection signal, and the vibration force is transmitted from the vibration generator to the peripheral interface device within the mechanism body.

4. The abnormal sound detection device according to claim 3, wherein the mechanism body at least comprises an upper cover and a base plate, and the peripheral interface device is arranged between the upper cover and the base plate, wherein the vibration generator is located near or attached on the base plate.

5. The abnormal sound detection device according to claim 3, wherein one of the vibration simulation mechanism and the controlling and analyzing device further comprises a driving and amplifying unit, wherein after the abnormal sound detection signal is amplified by the driving and amplifying unit, an amplified abnormal sound detection signal is generated, and the vibration generator generates the vibration force in response to the amplified abnormal sound detection signal.

6. The abnormal sound detection device according to claim 3, wherein each of the abnormal sound detection sub-signals is a frequency-sweeping test signal or a pink noise test signal.

7. The abnormal sound detection device according to claim 1, wherein each of the plural audio collectors is a microphone, a sound guide tube or a patch-type sound receiving element.

8. The abnormal sound detection device according to claim 1, wherein the plural audio collectors are distributed in an array arrangement, and each row of audio collectors or each column of audio collectors in the array arrangement are classified into the at least two audio collection units.

9. The abnormal sound detection device according to claim 8, wherein the audio collecting device further comprises an audio collection unit selector, wherein the at least two audio collection units are selectively enabled in turn by the audio collection unit selector at the different time points.

10. The abnormal sound detection device according to claim 1, wherein the audio collecting device is a fixed-type audio collecting device or a movable-type audio collecting device.

11. The abnormal sound detection device according to claim 1, wherein the controlling and analyzing device comprises:
    a storage module electrically connected with the audio collecting device, wherein the plural vibration audio unit signals are inputted and stored into the storage module;
    a controlling and processing module electrically connected with the storage module, the vibration simulation mechanism and the audio collecting device, wherein the controlling and processing module controls and generates the abnormal sound detection signal, the abnormal sound detection signal is issued to the audio collecting device and the vibration simulation mechanism, and the plural the vibration audio unit signals are inputted into the controlling and processing module; and an analyzing and detecting module electrically connected with the controlling and processing module, wherein the analyzing and detecting module detects and identifies whether there is the abnormal sound phenomenon in any of the plural vibration audio unit signals.

12. The abnormal sound detection device according to claim 11, wherein each of the plural abnormal sound detection sub-signals contains a frequency-sweeping test signal or a pink noise test signal and further contains a synchronization signal posterior to the frequency-sweeping test signal or the pink noise test signal, wherein the analyzing and detecting module recognizes and analyzes the frequency-sweeping test signal or the pink noise test signal adjacent to the synchronization signal, wherein after the frequency-sweeping test signal or the pink noise test signal is inputted into the vibration simulation mechanism, the audio collecting device generates the corresponding vibration audio unit signal with an effective identification vibration audio section, and the analyzing and detecting module judges whether there is the abnormal sound phenomenon in the effective identification vibration audio section.

13. The abnormal sound detection device according to claim 1, wherein each of the plural abnormal sound detection sub-signals contains an audio collection unit selecting signal and one of a frequency-sweeping test signal and a pink noise test signal sequentially, or the each of the plural abnormal sound detection sub-signals contains the audio collection unit selecting signal, one of the frequency-sweeping test signal and the pink noise test signal and a synchronization signal sequentially.

* * * * *